(12) United States Patent
Tanke et al.

(10) Patent No.: US 10,704,601 B2
(45) Date of Patent: Jul. 7, 2020

(54) BEARING ASSEMBLY

(71) Applicant: Aktiebolaget SKF, Gothenburg (SE)

(72) Inventors: Jesko-Henning Tanke, Schweinfurt (DE); Steffen Sendner, Wattendorf (DE); Sven Simon, Wasserlosen (DE); Johannes Ullmann, Wonfurt (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 16/217,170

(22) Filed: Dec. 12, 2018

(65) Prior Publication Data

US 2019/0186542 A1    Jun. 20, 2019

(30) Foreign Application Priority Data

Dec. 14, 2017  (DE) .................. 10 2017 222 795

(51) Int. Cl.
| | |
|---|---|
| *F16C 33/58* | (2006.01) |
| *F16C 43/06* | (2006.01) |
| *F16C 33/60* | (2006.01) |
| *F16C 19/18* | (2006.01) |
| *F16C 41/04* | (2006.01) |
| *F16C 33/36* | (2006.01) |

(52) U.S. Cl.
CPC .......... *F16C 33/585* (2013.01); *F16C 19/181* (2013.01); *F16C 33/586* (2013.01); *F16C 33/60* (2013.01); *F16C 33/605* (2013.01); *F16C 41/04* (2013.01); *F16C 43/06* (2013.01); *F16C 19/184* (2013.01); *F16C 33/36* (2013.01)

(58) Field of Classification Search
CPC .... F16C 19/385; F16C 19/386; F16C 33/366; F16C 33/60; F16C 33/605; F16C 43/04
See application file for complete search history.

(56) References Cited

U.S. PATENT DOCUMENTS

| | | | | |
|---|---|---|---|---|
| 2,447,928 A | * | 8/1948 | Bergstrom | ............ F16C 19/386 384/571 |
| 9,140,296 B2 | * | 9/2015 | Caspall | ................. F16C 35/063 |
| 2005/0232528 A1 | * | 10/2005 | Gobel | ................... F16C 19/386 384/571 |

* cited by examiner

*Primary Examiner* — Phillip A Johnson
(74) *Attorney, Agent, or Firm* — J-TEK Law PLLC; Scott T. Wakeman; Mark A. Ussai

(57) ABSTRACT

A bearing assembly includes first and second rolling-element bearings each having first and second bearing rings, a raceway and a flange element at both ends of the raceways. Two of the flange elements are formed on a common flange body, and the flange body is axially pressed onto cylindrical mounting surfaces of the first bearing rings of the first and second rolling-element bearings and held in place by a press fit.

17 Claims, 1 Drawing Sheet

BEARING ASSEMBLY

CROSS-REFERENCE

This application claims priority to German patent application no. 10 2017 222 795.8 filed on Dec. 14, 2017, the contents of which are fully incorporated herein by reference.

TECHNOLOGICAL FIELD

The present disclosure relates to a bearing assembly having first and second rolling-element bearings having flanges, where one flange of each of the two rolling-element bearings is formed on a common body and to a method of manufacturing such a bearing assembly.

BACKGROUND

In general, bearing rings for rolling-element bearings include at least one raceway for rolling elements, which raceway encircles a bearing axis. This raceway can be axially delimited by flanges, namely a guide flange and a retaining flange, wherein the flanges serve for guiding or supporting the rolling elements. In particular with tapered roller bearings the guide flange supports the axial forces of the rolling elements that arise in operation, whereas the retaining flange only performs a retaining function that prevents the rolling elements from falling out during transport or assembly.

The flanges are typically formed one-piece with the bearing ring. However, in comparison to flangeless rolling-element bearings, the manufacture of a bearing ring including flanges configured one-piece is complex and cost-intensive. In addition, when machining is performed using a turning tool, limitations arise with respect to the geometric design of the flange, which limitations result from the retraction of the turning tool. For this reason special tools are required to form the entire raceway including the flanges.

It is therefore known to embody the retaining flange in particular as a separate component. Here the retaining flange is placed onto the bearing ring and fixedly connected thereto. However, additional positioning tools are required here in order to ensure a precise positioning of the retaining flange. Furthermore, in particular with tapered roller bearings that include an oblique raceway, the attached retaining flange can detach from the bearing ring, for example, by heating in operation, and slip off of the bearing ring. If such separate flanges are used in double row rolling-element bearings, the arrangement of the two rolling-element bearings prevents the respective separate flanges from slipping off. However, an axial displacement of the flanges can occur due to manufacturing tolerances.

SUMMARY

It is therefore an aspect of the present disclosure to provide a double row bearing assembly including separately manufactured flanges, wherein a simple and secure positioning of the respective flange is possible.

The bearing assembly is comprised of a first and a second rolling-element bearing, which each include an inner ring and an outer ring. The two rolling-element bearings are configured as a double-row rolling-element bearing and disposed axially adjacent to each other.

The inner rings and/or the outer rings include a rolling-element raceway that is axially delimited by a first and a second flange element (or flange body), wherein the inner rings and/or the outer rings of the first and of the second rolling-element bearing are disposed axially adjacent to each other. In operation, rolling elements, in particular tapered rollers, can roll on the rolling-element raceways. Here the rolling elements are each guided and supported by the first and second flange element, wherein one of the flange elements can be a guide flange and the other flange element a retaining flange. In a back-to-back arrangement of the first and second rolling-element bearings the retaining flanges of the two rolling-element bearings abut on one another; in a face-to-face arrangement the guide flanges abut on one another.

The flange elements of the rolling-element bearings can be configured as separate components. In order to prevent a displacing or slipping of the separate flange elements that are located between the two rolling-element bearings, for example, due to manufacturing tolerances, the flange elements abutting on each other, in particular those of the inner ring, are configured as a common flange element. The two rolling-element bearings thus include the flange disposed between them as a common flange element. It can thus be prevented that two individual flange elements flank each other and abut.

On both sides, that is, for the first rolling-element bearing and the second rolling-element bearing, the common flange element assumes the function of either the retaining flange or of the guide flange (depending on the arrangement of the rolling-element bearing). A displacement of the common flange element is prevented by the rolling-element bearings, or rings of the rolling-element bearings, positioned against each other, since the common flange element is secured from both sides by a rolling-element bearing against an axial displacement.

According to one embodiment the common flange element is pressed on or thermally shrunk onto the two inner rings or outer rings. For this purpose the common flange element is first pushed onto one of the inner rings or outer rings and then the second of the inner rings or outer rings is pushed-in into the common flange element. The common flange element is subsequently pressed on or thermally shrunk on. This can be effected, for example, by the common flange element being heated, thereby expanding due to the material, and being pushed onto the bearing rings in the heated state. With the cooling of the common flange element it contracts again so that a press fit of the common flange element on the bearing rings is formed.

Alternatively or additionally the common flange element can be fixedly adhered onto the bearing rings or attached in another way.

In one alternative embodiment the common flange element is pressed on or thermally shrunk onto one of the two inner rings or outer rings and has a clearance with respect to the other of the two inner rings or outer rings. In this embodiment the common flange element is first disposed on one of the rings, for example, slipped on, pushed on, and pressed on or thermally shrunk onto the ring. The second ring is then pushed-in into the common flange element. In order to make this pushing-in possible, a radial clearance is present between the already pressed on or shrunk on flange element and the second inner ring or outer ring. The common flange element can be, for example, fixedly adhered to the second inner ring or outer ring in order to prevent a displacing of the common flange element with respect to the second inner ring or outer ring.

After the pressing on or shrinking on the common flange element can be post-processed together with the inner rings or outer rings. In particular, the common flange element can be pressed on or shrunk onto the inner rings as an unprocessed element in annular form. Since the shape or contour of the common flange element can change due to this pressing on or shrinking on, it is advantageous if the machining of the surface of the common flange element occurs only after this step. In order to simplify the post-processing or to reduce the necessary steps, for example, the combination of inner rings or outer rings and common flange element can be post-processed simultaneously. Here, among other things, the end contour of the flange and raceways can be applied by machining.

The inner rings or the outer rings of the first and of the second rolling-element bearing can include a radially extending stop offset axially inward toward the raceway, which stop is for receiving the common flange element. Due to this stop the common flange element can be additionally secured by interference fit on the inner rings or outer rings.

Alternatively this interference fit can also be embodied by a conical seat for receiving the common flange element. Here the inner rings or outer rings of the first and of the second rolling-element bearing, which inner rings or outer rings abut against each other, each have a conical end onto which the common flange element can be pushed.

For example, the common flange element can be comprised of rolling-element bearing steel that can be hardened or unhardened, quenched and tempered steel, and alloy steel or at least low alloy steel, or of spring steel that can be profiled and hardened. Here the common flange element can either have been rolled one-piece or be welded, soldered, adhered, or connected by screws to form a ring from an open material bent in an annular manner. If the common flange element constitutes the retaining flange, the material of the common flange element is not subjected to rolling stress and is also not exposed to high wear. In this case it therefore need not have the same hardness as a bearing ring.

In order to ensure an additional securing of the flange element on the inner or outer rings, the common flange element can include securing elements. These securing elements can be, for example, pins, clamping pins, rivets, or screws, by which the common flange element can be secured on the inner ring or outer ring. The securing elements are preferably oriented radially and distributed about the circumference of the common flange element. Here the securing elements can engage though the inner rings or outer rings into the common flange element. In particular, the securing elements can be distributed uniformly about the circumference of the common flange element. Alternatively only a single securing element can also be provided in order to secure the common flange element on the inner rings or outer rings. It can also be secured only to one of the inner rings or outer rings.

According to a further aspect, a method is proposed for manufacturing a bearing assembly including a first and a second rolling-element bearing, wherein the first and the second rolling-element bearing each include an inner ring and an outer ring, wherein the inner rings and/or the outer rings include a rolling-element raceway that is axially delimited by a first and a second flange element.

In the manufacturing method the first rolling-element bearing is first positioned. A common flange element is then pushed onto the inner ring or the outer ring of the first rolling-element bearing. The second rolling-element bearing is then placed into abutment with the first rolling-element bearing, so that the inner rings and/or the outer rings of the first and second rolling-element bearings are disposed axially adjacent to each other and the common flange element is pushed onto the inner ring or the outer ring of the second rolling-element bearing. Here the abutting first or second flange elements of the inner rings and/or of the outer rings of the first and of the second rolling-element bearing are formed by the common flange element.

According to one embodiment, following the arranging of the rolling-element bearing and of the common flange element the common flange element is pressed on or thermally shrunk onto both inner rings or outer rings.

The pressing on or thermal shrinking on can follow post-processing of the common flange element and of the two inner rings or outer rings. In this post-processing the final contours can be produced on the inner rings or outer rings and the flange element.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
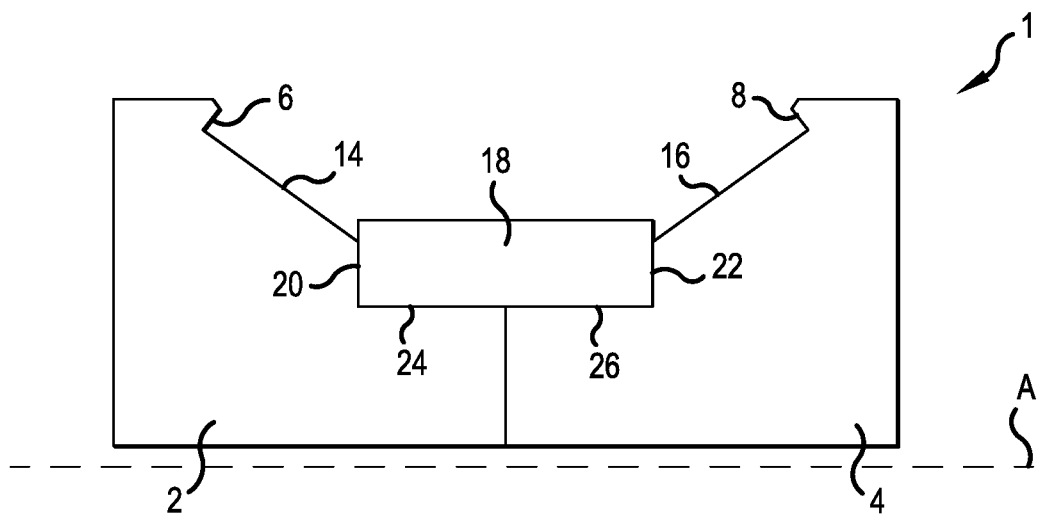
FIG. 1 is a schematic sectional view of a bearing assembly including two rolling-element bearings and a common flange member in a first configuration.

FIG. 1 shows a bearing assembly 1 in a first processing step. Here the bearing assembly is comprised of a first and a second rolling-element bearing 2, 4. The rolling-element bearings 2, 4 are configured as a double row bearing assembly and disposed axially adjacent to each other. In FIG. 1 a back-to-back arrangement is shown with the bearing rings that are rotatable about a bearing axis A. However, the rolling-element bearings 2, 4 can also be disposed analogously in a face-to-face arrangement.

The bearing rings each include a rolling-element raceway 14, 16 that is axially delimited in one direction by a guide flange 6, 8. In operation, rolling elements, in particular tapered rollers, can roll on the rolling-element raceways 14, 16. In order to not only guide the rolling elements by the guide flanges 6, 8, but also to support them on the other side, a retaining flange is attached.

For this purpose a common flange element 18 is first pushed onto the bearing rings of the first and second rolling-element bearing 2, 4. For this purpose the bearing rings each include a bearing surface 24, 26 onto which the common flange element 18 is pushed on. Here the common flange element 18 is first pushed onto the bearing surface 24 of the bearing ring of the first rolling-element bearing 2. The bearing ring of the second rolling-element bearing 4 is then pushed-in with its bearing surface 26 into the common flange element.

The common flange element 18 can be secured by interference fit on the bearing rings by a stop 20, 22 on each of the rolling-element bearings 2, 4, which stop extends radially and is offset axially inward toward the raceways 14, 16. The common flange element 18 is thus disposed on a cylindrical shoulder that is formed by the bearing surfaces 24, 26 and the stops 20, 22. Here the common flange element 18 is clamped firmly between the stops 20, 22.

Alternatively to the cylindrical shoulder, the bearing rings can also include a conical seat (not shown) onto which the common flange element 18 is pushed on. In this case the two bearing rings have no step as a continuation of the raceways 14, 16, but rather a conical section.

After the common flange element 18 has been pushed on, it can be pressed on or thermally shrunk on. The bearing rings as well as the common flange element 18 can then be post-processed. The common flange element 18 is preferably post-processed together with the bearing rings. For example, the end contour of the flanges 6, 8, 10, 12 and of the raceways 14, 16 is applied by machining to the combination of bearing rings and common flange element 18.

Figure 2:
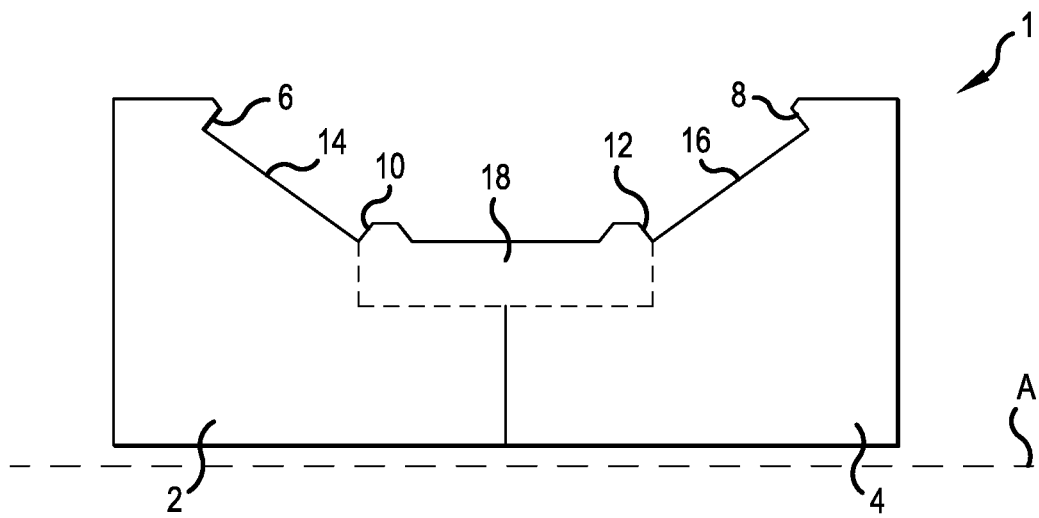
FIG. 2 is a schematic sectional view of the bearing assembly of FIG. 1 with the common flange member processed to include a first flange and a second flange

The bearing assembly 1 after the post-processing is shown in FIG. 2. After the post-processing step the bearing assembly 1 shows a retaining flange 10, 12 for each rolling-element bearing 2, 4. Depending on the arrangement of the rolling-element bearings 2, 4, the common flange element 18 assumes on both sides, that is for the first rolling-element bearing 2 and the second rolling-element bearing 4, the function of either the retaining flange 10, 12 (as shown in FIG. 2) or of the guide flange (not shown). A displacing of the common flange element can be prevented by the rolling-element bearings 2, 4, or rings of the rolling-element bearings 2, 4, positioned against each other, since the common flange element is secured from both sides by a rolling-element bearing 2, 4 against an axial displacing.

In summary, a bearing assembly including a separately manufactured retaining flange or guide flange is provided. A simple and secure positioning of the respective flange is ensured by the arrangement of two rolling-element bearings that include the retaining flange or guide flange as a common flange element. Here the common flange element is secured against axial displacement by the rolling-element bearings placed against each other.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 First rolling-element bearing
4 Second rolling-element bearing
6, 8 Guide flange
10, 12 Retaining flange
14, 16 Raceway
18 Common flange element
20, 22 Stop
24, 26 Bearing surface
A Axis of rotation

What is claimed is:

1. A bearing assembly comprising:
a first rolling-element bearing including a first bearing ring and a second bearing ring, the first bearing ring of the first rolling-element bearing including a raceway axially delimited by a first flange element and a second flange element,
a second rolling-element bearing disposed axially adjacent to the first rolling-element bearing, the second rolling-element bearing including a first bearing ring and a second bearing ring, the first bearing ring of the second rolling-element bearing including a raceway axially delimited by a first flange element and a second flange element,
wherein the first flange element of the first bearing ring of the first rolling-element bearing and the first flange element of the first bearing ring of the second rolling-element bearing are formed on a common flange body, the common flange body being mounted on the first bearing ring of the first rolling-element bearing and on the first bearing ring of the second rolling-element bearing, and
wherein the first bearing ring directly contacts the second bearing ring at a joint.

2. The bearing assembly according to claim 1, wherein the common body is pressed onto a cylindrical mounting surface of the first bearing ring of the first rolling-element bearing and onto a cylindrical mounting surface of the first bearing ring of the second rolling-element bearing.

3. The bearing assembly according to claim 2, wherein the common body is thermally shrunk onto the cylindrical mounting surface of the first bearing ring of the first rolling-element bearing and onto the cylindrical mounting surface of the first bearing ring of the second rolling-element bearing.

4. The bearing assembly according to claim 1, wherein the first bearing ring of the first rolling-element bearing and the first bearing ring of the second rolling-element bearing each includes a radially extending stop surface in axial contact with the common flange body.

5. The bearing assembly according to claim 1, wherein the common flange body is formed from a material selected from the group consisting of rolling-element bearing steel, quenched and tempered steel, spring steel, and unalloyed steel.

6. The bearing assembly according to claim 1, wherein the common flange body includes a plurality of securing elements configured to secure the common flange body to the first bearing ring of the first rolling-element bearing and to the first bearing ring of the second rolling-element bearing.

7. The bearing assembly according to claim 1, wherein the first bearing rings of the first and second rolling-element bearings each comprise an inner bearing ring.

8. The bearing assembly according to claim 1
wherein the common flange body is pressed or thermally shrunk onto a cylindrical mounting surface the first bearing ring of the first rolling-element bearing and onto a cylindrical mounting surface of the first bearing ring of the second rolling-element bearing,
wherein the common flange body is formed from a material selected from the group consisting of rolling-element bearing steel, quenched and tempered steel, spring steel, and unalloyed steel,
wherein the common flange body includes a plurality of securing elements configured to secure the common flange body to the first bearing ring of the first rolling-element bearing and the first bearing ring of the second rolling-element bearing, and
wherein the first bearing rings of the first and second rolling-element bearings each comprise an inner bearing ring.

9. The bearing assembly according to claim 1,
wherein the common flange body includes a radially outer surface having a first radially outward projection at a first axial end and a second radially outward projection at a second axial end spaced from the first radially outward projection, and
wherein the first flange element is formed on an axially outer side of the first radially outward projection and the second flange element is formed on an axially outer side of the second radially outward projection.

10. The bearing assembly according to claim 9, wherein the radially outer surface is substantially cylindrical.

11. The bearing assembly according to claim 1,
wherein the common flange body is pressed onto the cylindrical mounting surface of the first bearing ring of the first rolling-element bearing and wherein the common flange body has a clearance with respect to the cylindrical mounting surface of the first bearing ring of the second rolling-element bearing.

12. The bearing assembly according to claim 1,
wherein the first bearing ring of the first rolling-element bearing and the first bearing ring of the second rolling-element bearing each includes a conical seat for receiving the common flange body.

13. A bearing assembly comprising:
a first rolling-element bearing including a first bearing ring and a second bearing ring, the first bearing ring of the first rolling-element bearing including a raceway axially delimited by a first flange element and a second flange element,
a second rolling-element bearing disposed axially adjacent to the first rolling-element bearing, the second rolling-element bearing including a first bearing ring and a second bearing ring, the first bearing ring of the second rolling-element bearing including a raceway axially delimited by a first flange element and a second flange element,
wherein the first flange element of the first bearing ring of the first rolling-element bearing and the first flange element of the first bearing ring of the second rolling-element bearing are formed on a common flange body, the common flange body being mounted on the first bearing ring of the first rolling-element bearing and on the first bearing ring of the second rolling-element bearing, and
wherein the common flange body is pressed onto the cylindrical mounting surface of the first bearing ring of the first rolling-element bearing and wherein the common flange body has a clearance with respect to the cylindrical mounting surface of the first bearing ring of the second rolling-element bearing.

14. A bearing assembly comprising:
a first rolling-element bearing including a first bearing ring and a second bearing ring, the first bearing ring of the first rolling-element bearing including a raceway axially delimited by a first flange element and a second flange element,
a second rolling-element bearing disposed axially adjacent to the first rolling-element bearing, the second rolling-element bearing including a first bearing ring and a second bearing ring, the first bearing ring of the second rolling-element bearing including a raceway axially delimited by a first flange element and a second flange element,
wherein the first flange element of the first bearing ring of the first rolling-element bearing and the first flange element of the first bearing ring of the second rolling-element bearing are formed on a common flange body, the common flange body being mounted on the first bearing ring of the first rolling-element bearing and on the first bearing ring of the second rolling-element bearing, and
wherein the first bearing ring of the first rolling-element bearing and the first bearing ring of the second rolling-element bearing each includes a conical seat for receiving the common flange body.

15. A method for manufacturing a bearing assembly comprising:
providing a first bearing ring having a raceway, a first flange element at a first end of the raceway and a cylindrical mounting surface at a second end of the raceway,
providing a second bearing ring having a raceway, a first flange element at a first end of the raceway of the second bearing ring and a cylindrical mounting surface at a second end of the raceway of the second bearing ring,
pressing an annular common flange body axially onto the cylindrical mounting surface of the first bearing ring to form a press fit;
pressing the cylindrical mounting surface of the second bearing ring axially into the annular common flange body until the second bearing ring abuts the first bearing ring,
forming a second flange element of the first bearing ring at a first axial side of the common flange body and forming a second flange element of the second bearing ring at a second axial side of the common flange body, and
post-processing the common flange body and the first bearing ring and the second bearing ring.

16. The method according to claim 15, wherein the first bearing ring has a radially extending stop wall and the second bearing ring has a radially extending stop wall and wherein pressing the common flange body axially onto the cylindrical mounting surface of the first bearing ring includes pressing the common flange body into abutment with the radially extending stop wall of the first bearing ring and wherein pressing the cylindrical mounting surface of the second bearing ring axially into the common flange body comprises pressing the common flange body into abutment with the radially extending stop wall of the second bearing ring.

17. The method according to claim 15, wherein the press fit is formed by thermally shrinking the common flange body.

\* \* \* \* \*